US011068034B2

(12) United States Patent
Ashwood et al.

(10) Patent No.: US 11,068,034 B2
(45) Date of Patent: Jul. 20, 2021

(54) TEMPERATURE MANAGEMENT IN WEARABLE DEVICES

(71) Applicant: Snap Inc., Santa Monica, CA (US)

(72) Inventors: Andrea Ashwood, Los Angeles, CA (US); Michael Wollman, Boulder, CO (US); Nicholas Larson, Playa Vista, CA (US); Patrick Timothy McSweeney Simons, Downey, CA (US)

(73) Assignee: Snap Inc., Santa Monica, CA (US)

( * ) Notice: Subject to any disclaimer, the term of this patent is extended or adjusted under 35 U.S.C. 154(b) by 30 days.

(21) Appl. No.: 16/723,663

(22) Filed: Dec. 20, 2019

(65) Prior Publication Data

US 2020/0142458 A1 May 7, 2020

Related U.S. Application Data

(63) Continuation of application No. 16/236,114, filed on Dec. 28, 2018, now Pat. No. 10,551,889, which is a (Continued)

(51) Int. Cl.
*G06F 1/20* (2006.01)
*H04B 1/3827* (2015.01)
(Continued)

(52) U.S. Cl.
CPC .............. *G06F 1/206* (2013.01); *G06F 1/163* (2013.01); *H04B 1/036* (2013.01); *H04B 1/385* (2013.01);
(Continued)

(58) Field of Classification Search
CPC ......... G06F 1/206; G06F 1/163; H04B 1/036; H04B 1/385; H04B 2001/3866; H04N 5/23206; Y02D 10/00
See application file for complete search history.

(56) References Cited

U.S. PATENT DOCUMENTS 6,087,949 A 7/2000 Yanagida
9,668,217 B1 5/2017 Bamberger et al.
(Continued)

FOREIGN PATENT DOCUMENTS

WO 2019046797 3/2019

OTHER PUBLICATIONS

U.S. Appl. No. 15/693,103 U.S. Pat. No. 10,216,236, Aug. 31, 2017, Systems and Methods for Temperature Management in Wearable Devices.
(Continued)

*Primary Examiner* — Shahbaz Nazrul
(74) *Attorney, Agent, or Firm* — Schwegman Lundberg & Woessner, P.A.

(57) ABSTRACT

Systems and methods for managing temperatures of wearable device components are disclosed. In one aspects, a method includes determining a temperature of an electronic component of the wearable device, determining a rate of temperature change of the electronic component, and determining whether to increase or decrease a transmission rate limit of the electronic component based on the temperature and the rate, adjusting the transmission rate limit based on the determination, and limiting a rate of transmission of the electronic component based on the adjusted transmission rate limit.

20 Claims, 10 Drawing Sheets

Related U.S. Application Data continuation of application No. 15/693,103, filed on Aug. 31, 2017, now Pat. No. 10,216,236.

(51) Int. Cl.
*H04N 5/232* (2006.01)
*G06F 1/16* (2006.01)
*H04B 1/036* (2006.01)

(52) U.S. Cl.
CPC . *H04N 5/23206* (2013.01); *H04B 2001/3866* (2013.01)

(56) References Cited

U.S. PATENT DOCUMENTS

| | | | |
|---|---|---|---|
| 10,216,236 | B1 | 2/2019 | Ashwood et al. |
| 10,551,889 | B2 | 2/2020 | Ashwood et al. |
| 2002/0107054 | A1* | 8/2002 | Fujisawa ................ G07B 15/00 455/573 |
| 2007/0083778 | A1 | 4/2007 | Nagano |
| 2012/0189264 | A1 | 7/2012 | Okazaki et al. |
| 2012/0189265 | A1 | 7/2012 | Okazaki et al. |
| 2013/0002798 | A1 | 1/2013 | Sano |
| 2013/0120630 | A1 | 5/2013 | Kim et al. |
| 2014/0267799 | A1 | 9/2014 | Sadasivam et al. |
| 2014/0380029 | A1 | 12/2014 | Tokuda |
| 2015/0134988 | A1 | 5/2015 | Wang et al. |
| 2015/0189788 | A1 | 7/2015 | Champagne et al. |
| 2015/0229816 | A1 | 8/2015 | Tomiyasu |
| 2016/0249011 | A1 | 8/2016 | Lai et al. |
| 2019/0064891 | A1 | 2/2019 | Ashwood et al. |
| 2019/0187765 | A1 | 6/2019 | Ashwood et al. |
| 2020/0043440 | A1* | 2/2020 | Qiu ........................ G06F 9/544 |
| 2020/0117264 | A1* | 4/2020 | DeBates ................ G05B 15/02 |

OTHER PUBLICATIONS

U.S. Appl. No. 16/236,114 U.S. Pat. No. 10,551,889, Dec. 28, 2018, Temperature Management in Wearable Devices.

"U.S. Appl. No. 15/693,103, Notice of Allowance dated Sep. 26, 2018", 12 pgs.

"International Application Serial No. PCT/US2018/049229, International Search Report dated Nov. 23, 2018", 4 pgs.

"International Application Serial No. PCT/US2018/049229, Written Opinion dated Nov. 23, 2018", 7 pgs.

"U.S. Appl. No. 15/693,103, Corrected Notice of Allowability dated Dec. 13, 2018", 9 pgs.

"U.S. Appl. No. 15/693,103, Corrected Notice of Allowability dated Jan. 28, 2019", 4 pgs.

"U.S. Appl. No. 16/236,114, Non Final Office Action dated Jun. 13, 2019", 11 pgs.

"U.S. Appl. No. 16/236,114, Response filed Sep. 3, 2019 to Non Final Office Action dated Jun. 13, 2019", 10 pgs.

"U.S. Appl. No. 16/236,114, Notice of Allowance dated Sep. 20, 2019", 10 pgs.

"International Application Serial No. PCT/US2018/049229, International Preliminary Report on Patentability dated Mar. 12, 2020", 9 pgs.

* cited by examiner

TEMPERATURE MANAGEMENT IN WEARABLE DEVICES

PRIORITY

This application is a continuation of, and claims priority to, U.S. patent application Ser. No. 16/236,114, filed Dec. 28, 2018, which is a continuation of, and claims priority to U.S. patent application Ser. No. 15/693,103, filed Aug. 31, 2017. The content of this prior application is considered part of this application, and is hereby incorporated by reference in its entirety.

BACKGROUND

The design of many wearable display systems may be constrained to ensure conform with certain requirements such as form factor. This constraint may result in marginal designs for electronic components. The constrained design may limit the functionality of these components when compared to designs without the constraints. This is particularly true for glasses with an integrated camera or display and wearable devices that integrate multiple functions using additional sensor or circuitry for other functions. Therefore, improved methods of managing these electronic components under these design constraints are desired.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
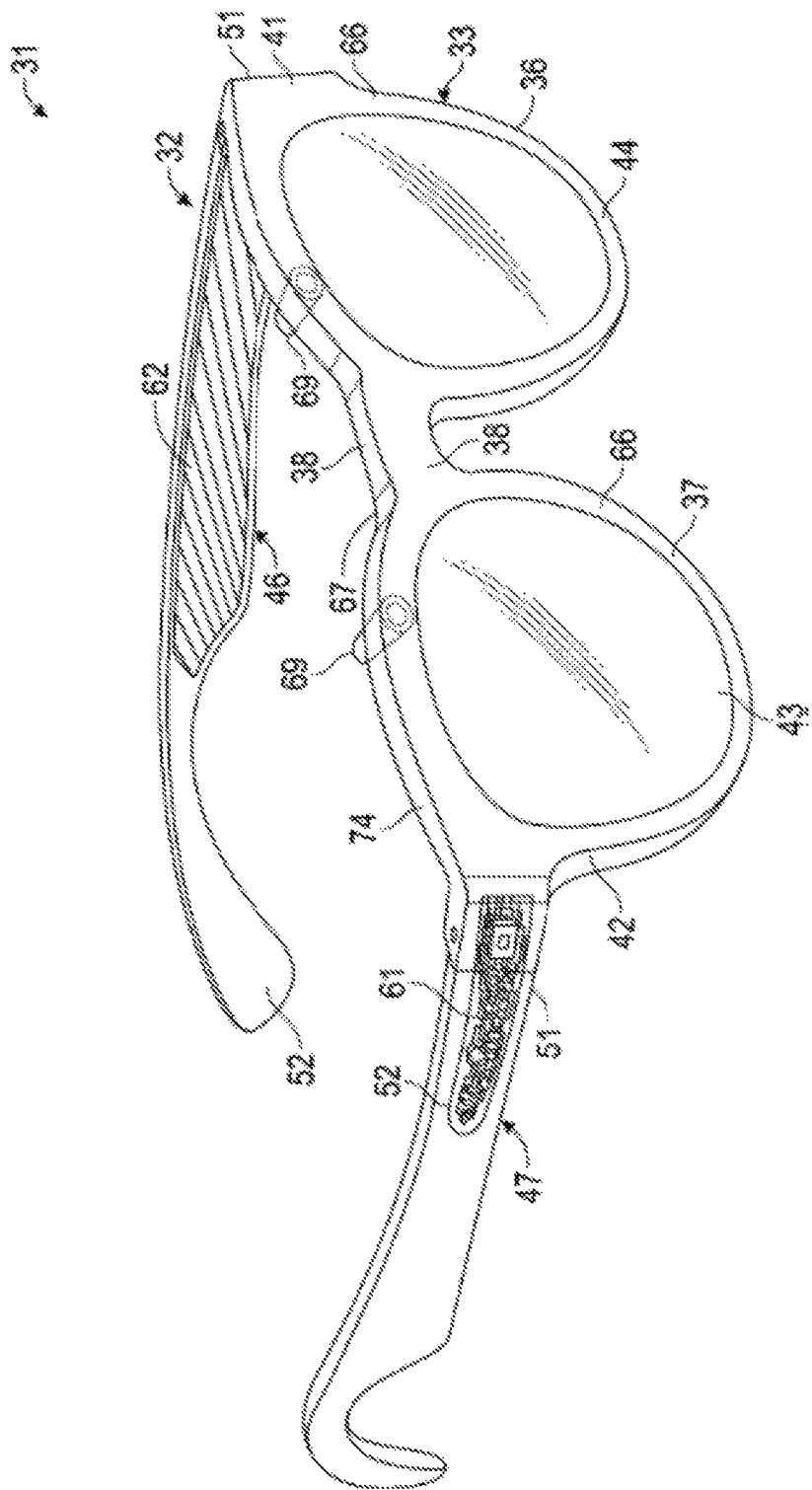
FIG. 1 is a front perspective view of one embodiment of camera device.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Embodiments described herein relate to systems and methods for managing temperature in a wearable device. Temperature of wearable devices may be managed by the disclosed methods and systems by limiting transmission bandwidth in some aspects based on a current temperature of an electronic component and in some aspects also based on a rate of temperature change of the electronic component. In some aspects, the temperature management may be based on at least two different temperature zones. When a temperature of an electronic component is within a first temperature zone, a first rate of change threshold may control how bandwidth is limited. When the temperature of the electronic component is within a second temperature zone, a second rate of change threshold may control how bandwidth is limited.

The disclosed methods and systems may provide for a more consistent user experience with WiFi transfers, while also preventing shutdown of electronic components due to those components reaching temperature constraints. The disclosed methods and systems may provide for improved comfort of the wearable device by ensuring that the touch temperature of the wearable device does not move into a temperature range that is uncomfortable for the user.

Certain embodiments described in detail herein include eyeglasses with integrated camera and wireless communication functionality. One example embodiment of such glasses includes a video processor for processing picture and video data from a camera. This camera data can then either be stored locally, or sent wirelessly to a client device such as a smartphone. Such glasses include separate low-power circuitry and high-speed circuitry in addition to the video processor. The low-power circuitry is designed to allow a low-power state, where the video processor and high-speed circuitry are off, and the low-power circuitry is monitoring battery power levels and communications with the user's smartphone or other client devices. Power levels and basic device functionality can be monitored from an application of a smartphone in communication with the glasses. The low-power circuitry is designed to be able to maintain this low-power state of the glasses for weeks on a single battery charge. Low-power state communications using the low-power circuitry may be enabled using a low-power wireless protocol such as Bluetooth™ low energy (Bluetooth LE.) By using a low-power processor and low-power wireless circuitry, the glasses are able to conserve power while maintaining a limited "on" state that avoids certain delays associated with powering on from an "off" state. This low-power "on" state also allows a user's smartphone to connect to the glasses at any time when the glasses have a battery charge.

The glasses of this example embodiment include a single button that allows a user to capture pictures or video. When the button is pressed and released, a picture is taken. When the button is pressed and held, a video is captured for the duration of the button hold. In either case, the low-power processor receives an input signal from the button, and the low-power processor manages the capture of camera data. The low-power processor may boot the video processor, and the video processor then captures camera data and writes the camera data to memory. The video processor may then be automatically powered off, and the glasses may return to a low-power state. In order to enable capture of camera data that is responsive to a user's button press while conserving power, the video processor of this example implementation uses a read only memory (ROM) with direct memory access (DMA) to boot the video processor in some aspects. Such a video processor can boot from an off state to capturing camera data within 300 milliseconds, and can then be returned to the off state as soon as the camera data is written to memory. This creates a responsive user experience while limiting battery drain.

Similarly, once camera data is captured in this example embodiment, the low-power circuitry manages an energy efficient connection to a client device, and transfer of the camera data to the device. For example, if the camera data is captured when there is no client device nearby, the low-power wireless circuitry may periodically transmit a service set identifier (SSID) When a smartphone running an application associated with the glasses receives the SSID, the application may automatically request any new camera data from the glasses. The low-power processor verifies that the camera data has not been sent to the smartphone previously; then the low-power processor boots a high-speed processor of the high-speed circuitry. The high-speed processor turns on high-speed wireless circuitry, such as an 802.11 Wi-Fi chip. This high-speed wireless circuitry is then used to transmit the camera data from the memory of the glasses to the smartphone. When the transmission of camera data completes, the high-speed circuitry may be automatically powered down, and the glasses return to the low-power state. Just as with the capture of camera data above, the low-power processor manages the high-speed circuitry, which consumes more power, to limit the power consumption by automatically returning the glasses to the low-power state when the data transfer is complete.

If the button on the glasses is pressed during transmission of the camera data, the low-power processor may interrupt the transmission to allow the video processor to boot, capture additional camera data, and power down as described above. The transfer may then be resumed if the smartphone is still in communication with the glasses, or may be resumed later if the connection has been interrupted.

The above example embodiment of glasses with an integrated camera is not limiting, and it will be apparent that many different embodiments are possible in view of the descriptions herein. Certain embodiments may be glasses with only the elements described above, including lenses, a frame, a video processor, high-speed circuitry, low-speed circuitry, a single button, and a battery system, with no other components. Other embodiments may have additional sensors, user interfaces, expanded memory, or any combination of additional elements.

One particular additional embodiment may include a display integrated with glasses. Such an embodiment may operate to conserve power in a manner similar to the operations described above for camera operation and camera data transfer. For example, an example embodiment with a display may operate in a low-power mode, with display elements powered down and low-power circuitry monitoring battery-life and low-power connections with client devices. Such an embodiment may receive a communication via a low-power wireless connection to display media content on the display of the glasses. In response to the communication, the low-power circuitry will initiate a power up and boot of any specified elements, present the media content on the display of the device, and then automatically power down the display and associated circuitry to return to the low-power state after a fixed amount of time.

Such operations may be integrated with any other operations and interrupts for any other elements included in the glasses with the display system.

Additionally, certain embodiments may not be glasses, but may be handheld camera devices, clothing attachments, watches, or any other such wearable device configured to capture camera data and communicate the data wirelessly to a client device. Additional details of example embodiments are described below.

FIG. 1 shows aspects of certain embodiments illustrated by a front perspective view of glasses 31. The glasses 31 can include a frame 32 made from any suitable material such as plastic or metal, including any suitable shape memory alloy. The frame 32 can have a front piece 33 that can include a first or left lens, display or optical element holder 36 and a second or right lens, display or optical element holder 37 connected by a bridge 38. The front piece 33 additionally includes a left end portion 41 and a right end portion 42. A first or left optical element 43 and a second or right optical element 44 can be provided within respective left and right optical element holders 36, 37. Each of the optical elements 43, 44 can be a lens, a display, a display assembly or a combination of the foregoing. Any of the display assemblies disclosed herein can be provided in the glasses 31.

Frame 32 additionally includes a left arm or temple piece 46 and a second arm or temple piece 47 coupled to the respective left and right end portions 41, 42 of the front piece 33 by any suitable means such as a hinge (not shown), so as to be coupled to the front piece 33, or rigidly or fixably secured to the front piece so as to be integral with the front piece 33. Each of the temple pieces 46 and 47 can include a first portion 51 that is coupled to the respective end portion 41 or 42 of the front piece 33 and any suitable second portion 52 for coupling to the ear of the user. In one embodiment the front piece 33 can be formed from a single piece of material, so as to have a unitary or integral construction. In one embodiment, such as illustrated in FIG. 1, the entire frame 32 can be formed from a single piece of material so as to have a unitary or integral construction.

Glasses 31 can include a computing device, such as computer 61, which can be of any suitable type so as to be carried by the frame 32 and, in one embodiment of a suitable size and shape, so as to be at least partially disposed in one of the temple pieces 46 and 47. In one embodiment, as illustrated in FIG. 1, the computer 61 is sized and shaped similar to the size and shape of one of the temple pieces 46, 4 7 and is thus disposed almost entirely if not entirely within the structure and confines of such temple pieces 46 and 47. In one embodiment, the computer 61 can be disposed in both of the temple pieces 46, 47. The computer 61 can include one or more processors with memory, wireless communication circuitry, and a power source. As described above, the computer 61 comprises low-power circuitry, high-speed circuitry, and a display processor. Various other embodiments may include these elements in different configurations or integrated together in different ways. Additional details of aspects of computer 61 may be implemented as illustrated by camera device 210 discussed below.

The computer 61 additionally includes a battery 62 or other suitable portable power supply. In one embodiment, the battery 62 is disposed in one of the temple pieces 46 or 47. In the glasses 31 shown in FIG. 1 the battery 62 is shown as being disposed in left temple piece 46 and electrically coupled using connection 74 to the remainder of the computer 61 disposed in the right temple piece 47. The one or more input and output devices can include a connector or port (not shown) suitable for charging a battery 62 accessible from the outside of frame 32, a wireless receiver, transmitter or transceiver shown) or a combination of such devices. In various embodiments, the computer 61 and the battery 62 may consume power as part of glasses operations for capturing images, transmitting data, or performing other computing processes. Such power consumption may result in heat that may impact the device as well as a user wearing the device. Embodiments described herein may function to manage temperature in wearable devices such as glasses 31.

Glasses 31 include cameras 69. Although two cameras are depicted, other embodiments contemplate the use of a single or additional (i.e., more than two) cameras. In various embodiments, glasses 31 may include any number of input sensors or peripheral devices in addition to cameras 69. Front piece 33 is provided with an outward facing, forward-facing or front or outer surface 66 that faces forward or away from the user when the glasses 31 are mounted on the face of the user, and an opposite inward-facing, rearward-facing or rear or inner surface 67 that faces the face of the user when the glasses 31 are mounted on the face of the user. Such sensors can include inwardly-facing video sensors or digital imaging modules such as cameras that can be mounted on or provided within the inner surface 67 of the front piece 33 or elsewhere on the frame 32 so as to be facing the user, and outwardly-facing video sensors or digital imaging modules such as cameras 69 that can be mounted on or provided with the outer surface 66 of the front piece 33 or elsewhere on the frame 32 so as to be facing away from the user. Such sensors, peripheral devices or peripherals can additionally include biometric sensors, location sensors, or any other such sensors.

Figure 2:
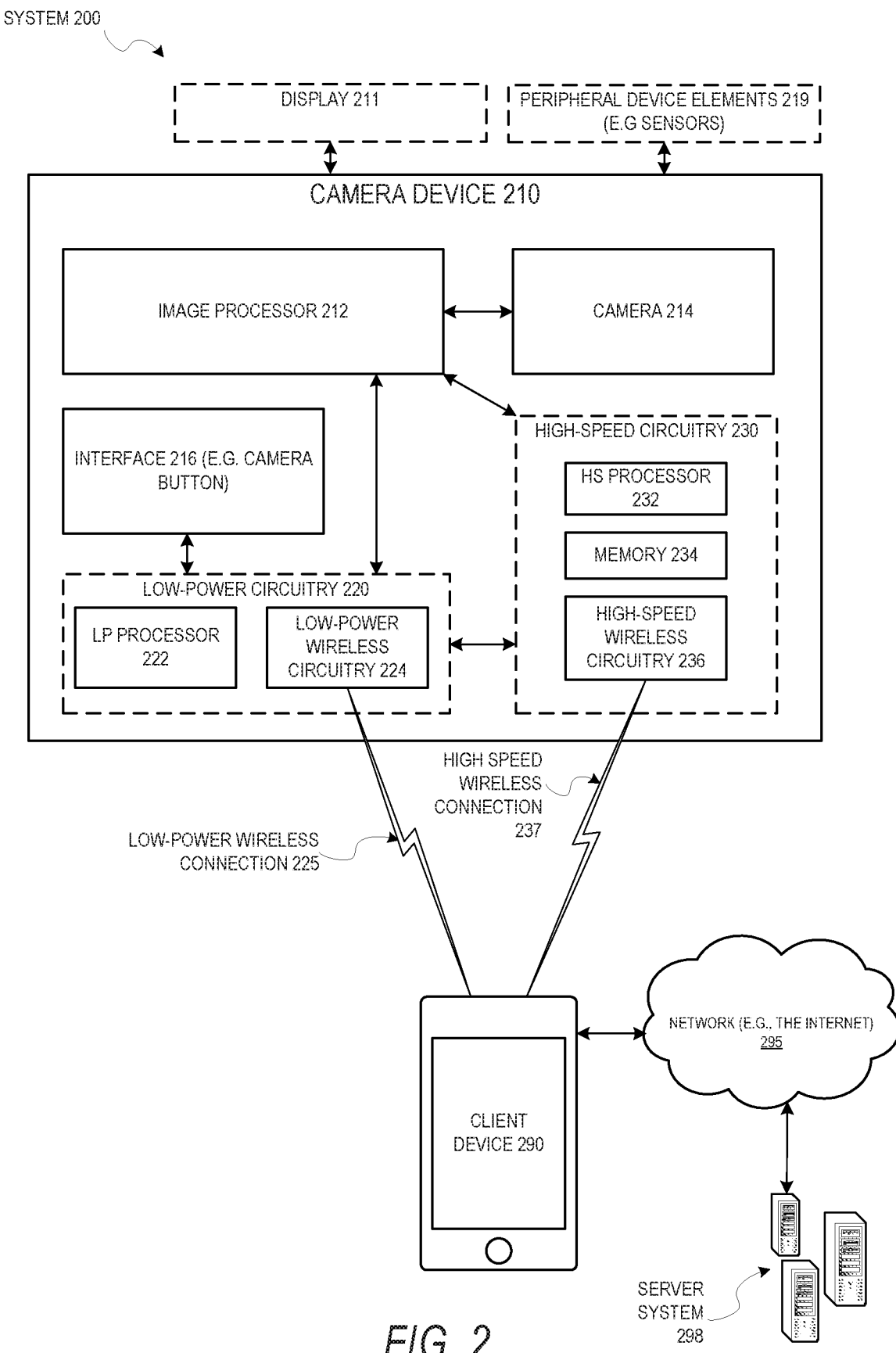
FIG. 2 is a block diagram illustrating a networked system including details of a camera device, according to some example embodiments.

FIG. 2 is a block diagram illustrating a networked system 200 including details of a camera device 210, according to some example embodiments. In certain embodiments, camera device 210 may be implemented in glasses 31 of FIG. 1 described above.

System 200 includes camera device 210, client device 290, and server system 298. Client device 290 may be a smartphone, tablet, phablet, laptop computer, access point, or any other such device capable of connecting with camera device 210 using both a low-power wireless connection 225 and a high-speed wireless connection 237. Client device 290 is connected to server system 298 and network 295. The network 295 may include any combination of wired and wireless connections. Server system 298 may be one or more computing devices as part of a service or network computing system. Client device 290 and any elements of server system 298 and network 295 may be implemented using details of software architecture 902 or machine 1000 described in FIGS. 9 and 10.

System 200 may optionally include additional peripheral device elements 219 and/or a display 211 integrated with camera device 210. Such peripheral device elements 219 may include biometric sensors, additional sensors, or display elements integrated with camera device 210. Examples of peripheral device elements 219 are discussed further with respect to FIGS. 9 and 10. For example, peripheral device elements 219 may include any I/O components 1050 including output components, 1052 motion components 1058, or any other such elements described herein. Example embodiments of a display 211 are discussed in FIGS. 3 and 4.

Camera device 210 includes camera 214, video processor 212, interface 216, low-power circuitry 220, and high-speed circuitry 230. Camera 214 includes digital camera elements such as a charge coupled device, a lens, or any other light capturing elements that may be used to capture data as part of camera 214. In some aspects, the camera 214 may be the camera 69, discussed above with respect to FIG. 1.

Interface 216 refers to any source of a user command that is provided to camera device 210. In one implementation, interface 216 is a physical button on a camera that, when depressed, sends a user input signal from interface 216 to low power processor 222. A depression of such a camera button followed by an immediate release may be processed by low power processor 222 as a request to capture a single image. A depression of such a camera button for a first period of time may be processed by low-power processor 222 as a request to capture video data while the button is depressed, and to cease video capture when the button is released, with the video captured while the button was depressed stored as a single video file. In certain embodiments, the low-power processor 222 may have a threshold time period between the press of a button and a release, such as 500 milliseconds or one second, below which the button press and release is processed as an image request, and above which the button press and release is interpreted as a video request. The low power processor 222 may make this determination while the video processor 212 is booting. In other embodiments, the interface 216 may be any mechanical switch or physical interface capable of accepting user inputs associated with a request for data from the camera 214. In other embodiments, the interface 216 may have a software component, or may be associated with a command received wirelessly from another source.

Video processor 212 includes circuitry to receive signals from the camera 214 and process those signals from the camera 214 into a format suitable for storage in the memory 234. Video processor 212 is structured within camera device 210 such that it may be powered on and booted under the control of low-power circuitry 220. Video processor 212 may additionally be powered down by low-power circuitry 220. Depending on various power design elements associated with video processor 212, video processor 212 may still consume a small amount of power even when it is in an off state. This power will, however, be negligible compared to the power used by video processor 212 when it is in an on state, and will also have a negligible impact on battery life. As described herein, device elements in an "off" state are still configured within a device such that low-power processor 222 is able to power on and power down the devices. A device that is referred to as "off" or "powered down" during operation of camera device 210 does not necessarily consume zero power due to leakage or other aspects of a system design.

In one example embodiment, video processor 212 comprises a microprocessor integrated circuit (IC) customized for processing sensor data from camera 214, along with volatile memory used by the microprocessor to operate. In order to reduce the amount of time that video processor 212 takes when powering on to processing data, a non-volatile read only memory (ROM) may be integrated on the IC with instructions for operating or booting the video processor 212. This ROM may be minimized to match a minimum size needed to provide basic functionality for gathering sensor data from camera 214, such that no extra functionality that would cause delays in boot time are present. The ROM may be configured with direct memory access (DMA) to the volatile memory of the microprocessor of video processor 212. DMA allows memory-to-memory transfer of data from the ROM to system memory of the video processor 212 independently of operation of a main controller of video processor 212. Providing DMA to this boot ROM further reduces the amount of time from power on of the video processor 212 until sensor data from the camera 214 can be processed and stored. In certain embodiments, minimal processing of the camera signal from the camera 214 is performed by the video processor 212, and additional processing may be performed by applications operating on the client device 290 or server system 298.

Low-power circuitry 220 includes low-power processor 222 and low-power wireless circuitry 224. These elements of low-power circuitry 220 may be implemented as separate elements or may be implemented on a single IC as part of a system on a single chip. Low-power processor 222 includes logic for managing the other elements of the camera device 210. As described above, for example, low power processor 222 may accept user input signals from an interface 216. Low-power processor 222 may also be configured to receive input signals or instruction communications from client device 290 via low-power wireless connection 225. Additional details related to such instructions are described further below. Low-power wireless circuitry 224 includes circuit elements for implementing a low-power wireless communication system. Bluetooth™ Smart, also known as Bluetooth™ low energy, is one standard implementation of a low power wireless communication system that may be used to implement low-power wireless circuitry 224. In other embodiments, other low power communication systems may be used.

High-speed circuitry 230 includes high-speed processor 232, memory 234, and high-speed wireless circuitry 236. High-speed processor 232 may be any processor capable of managing high-speed communications and operation of any general computing system needed for camera device 210. High speed processor 232 includes processing resources needed for managing high-speed data transfers on high-speed wireless connection 237 using high-speed wireless circuitry 236. In certain embodiments, the high-speed processor 232 executes an operating system such as a LINUX operating system or other such operating system such as operating system 904 of FIG. 9. In addition to any other responsibilities, the high-speed processor 232 executing a software architecture for the camera device 210 is used to manage data transfers with high-speed wireless circuitry 236. In certain embodiments, high-speed wireless circuitry 236 is configured to implement Institute of Electrical and Electronic Engineers (IEEE) 802.11 communication standards, also referred to herein as Wi-Fi. In other embodiments, other high-speed communications standards may be implemented by high-speed wireless circuitry 236.

Memory 234 includes any storage device capable of storing camera data generated by the camera 214 and video processor 212. While memory 234 is shown as integrated with high-speed circuitry 230, in other embodiments, memory 234 may be an independent standalone element of the camera device 210. In certain such embodiments, electrical routing lines may provide a connection through a chip that includes the high-speed processor 232 from the video processor 212 or low-power processor 222 to the memory 234. In other embodiments, the high-speed processor 232 may manage addressing of memory 234 such that the low-power processor 222 will boot the high-speed processor 232 any time that a read or write operation involving memory 234 is needed.

In various embodiments, the lower power circuitry 220 and/or the high-speed circuitry 230 may consume power as part of the operation of the camera device 210 and in the course of performing one or more functions such as capturing images, transmitting data, or performing other computing processes. Such power consumption may result in heat that may impact the camera device 210 as well as a user wearing the device. Embodiments described herein may function to manage temperature in wearable devices such as glasses 31, discussed above with respect to FIG. 1, of which the camera device 210 may be a part in some aspects.

Figure 3:
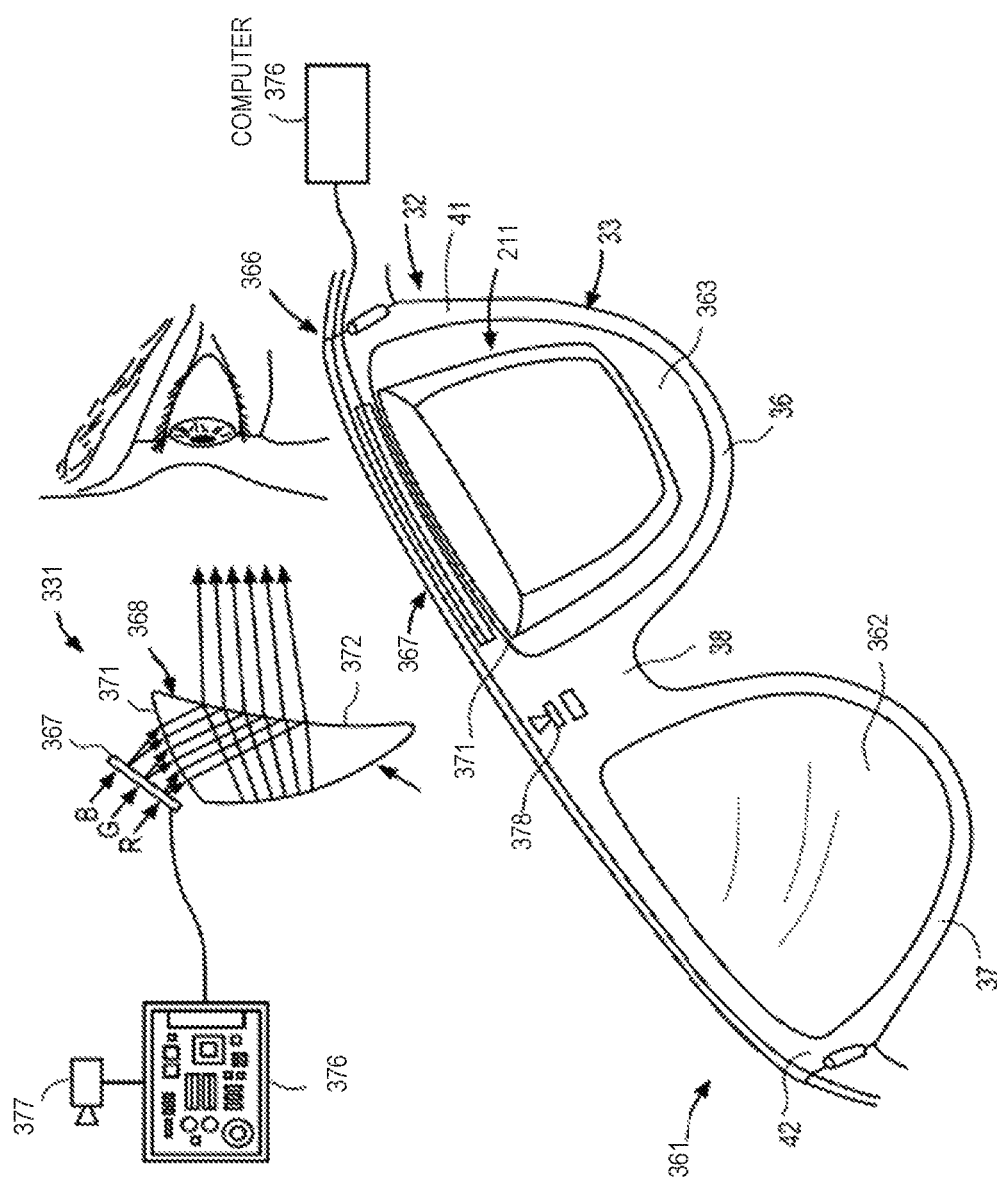
FIGS. 3 and 4 illustrate wearable devices including transmission components according to certain example embodiments.
Figure 4:
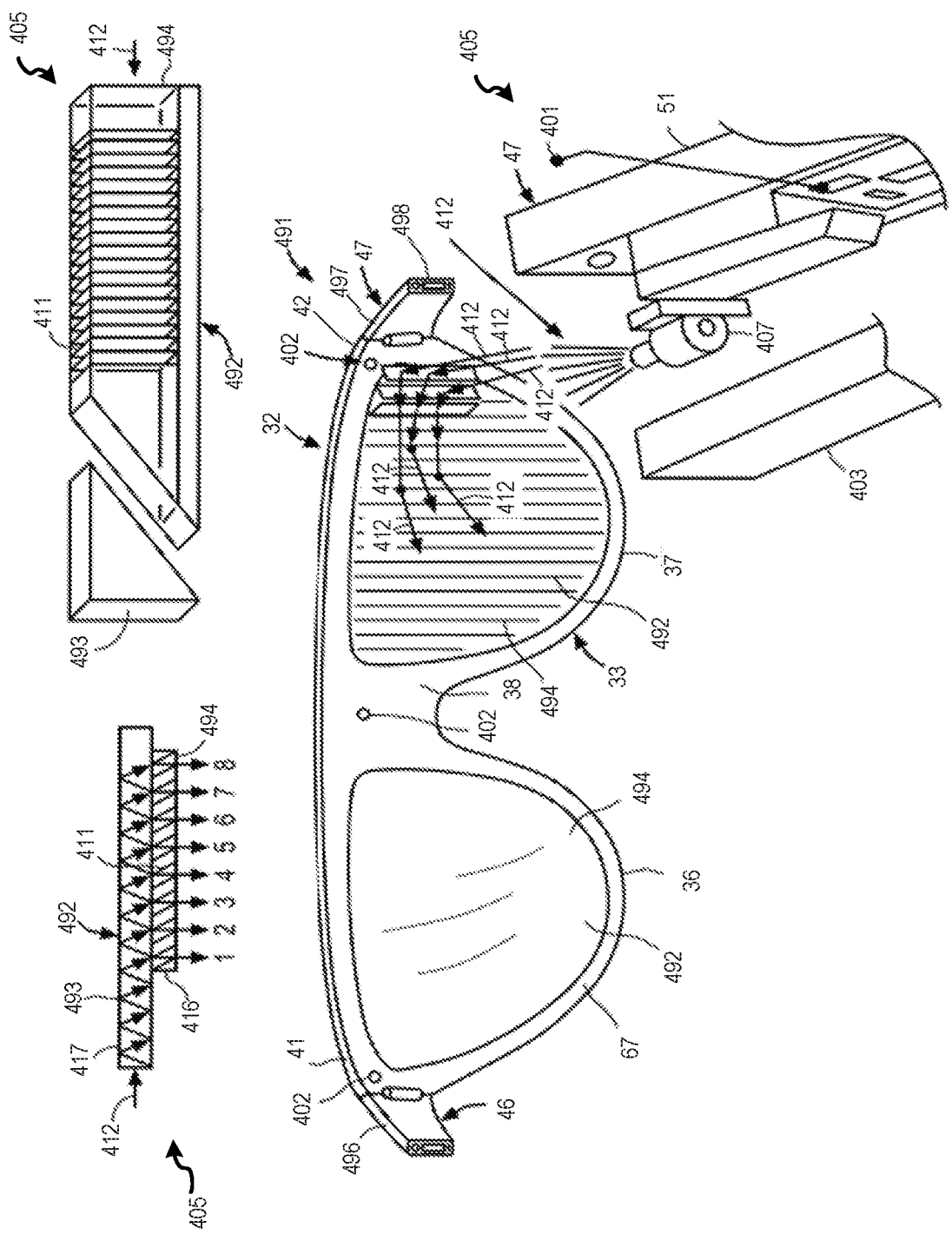

FIGS. 3 and 4 illustrate two embodiments of glasses which include display systems. In various different embodiments, such display systems may be integrated with the camera devices discussed above, or may be implemented as wearable devices without an integrated camera. In embodiments without a camera, power conservation systems and methods continue to operate for the display system and other such systems in a manner similar to what is described above for the video processor and data transfer elements of the camera devices.

FIG. 3 illustrates glasses 361 having an integrated display 211. The glasses 361 can be of any suitable type, including glasses 31, and like reference numerals have been used to describe like components of glasses 361 and 31. For simplicity, only a portion of the glasses 361 are shown in FIG. 3. Headwear or glasses 361 can optionally include left and right optical lenses:362, 563 secured within respective left and right optical element holders 36, 37. The glasses 361 can additionally include any suitable left and right optical elements or assemblies 366, which can be similar to any of the optical elements or assemblies discussed herein including optical elements 43, 44 of glasses 31. Although only one optical assembly 366 is shown in FIG. 3, it is appreciated that an optical assembly 366 can be provided for both eyes of the user.

In one embodiment, the optical assembly 366 includes any suitable display matrix 367. Such a display matrix 367 can be of any suitable type, such as a liquid crystal display (LCD), an organic light-emitting diode (OLED) display, or any other such display. The optical assembly 366 also includes an optical layer or layers 368, which can be include lenses, optical coatings, prisms, mirrors, waveguides, and other optical components in any combination. In the embodiment illustrated in FIG. 3, the optical layer 368 is a prism having a suitable size and configuration and including a first surface 371 for receiving light from display matrix 367 and a second surface 372 for emitting light to the eye of the user. The prism extends over all or at least a portion of the optical element holder 36, 37 so to permit the user to see the second surface 372 of the prism when the eye of the user is viewing through the corresponding optical element holder 36. The first surface 371 faces upwardly from the frame 32 and the display matrix 367 overlies the prism so that photons and light emitted by the display matrix 367 impinge the first surface 371. The prism is sized and shaped so that the light is refracted within the prism and is directed towards the eye of the user by the second surface 372. In this regard, the second surface 372 can be convex so as to direct the light towards the center of the eye. The prism can optionally be sized and shaped so as to magnify the image projected by the display matrix 367, and the light travels through the prism so that the image viewed from the second surface 372 is larger in one or more dimensions than the image emitted from the display matrix 367.

Glasses 361 can include any suitable computing system, including any of the computing devices disclosed herein, such as computer 61 or machine 1000. In the embodiment of FIG. 3, computer 376 powered by a suitable rechargeable battery (not shown), which can be similar to battery 62, is provided. Computer 376 can receive a data stream from one or more image sensors 377, which may be similar to camera 69, or the camera 214, with image sensors 377 positioned such that the image sensor 377 senses the same scene as an eye of a wearer of glasses 361. Additional sensors, such as outwardly-facing geometry sensor 378, can be used for any suitable purpose, including the scanning and capturing of three-dimensional geometry that may be used by computer 376 with data from image sensors 377 to provide information via digital display matrix 367.

Computer 376 is implemented using the processor elements of the camera device 210, including video processor 212, high-speed circuitry 230, and low-power circuitry 220. Computer 376 may additionally include any circuitry needed to power and process information for display matrix 367, which may be similar to display 211. In certain embodiments, video processor 212 or high-speed processor 232 may include circuitry to drive display matrix 367. In other embodiments, separate display circuitry may be integrated with the other elements of computer 376 to enable presentation of images on display matrix 367.

In various embodiments, the computer 376 may generate heat as part of glasses operations for capturing images, transmitting data, or performing other computing processes. The heat may impact the device as well as a user wearing the device. Embodiments described herein may function to manage temperature in wearable devices such as glasses 361.

FIG. 4 illustrates another example embodiment, shown as glasses 491, having another implementation of a display. Just as with glasses 361, glasses 491 can be of any suitable type, including glasses 31, and reference numerals have again been used to describe like components of glasses 491 and 361. Glasses 491 include optical lenses 492 secured within each of the left and right optical element holders 36, 37. The lens 492 has a front surface 493 and an opposite rear surface 494. The left and right end portions 41,42 of the frame front piece 33 can include respective left and right frame extensions 496, 497 that extend rearward from the respective end portions 41, 42. Left and right temple pieces 46, 47 are provided, and can either be fixedly secured to respective frame extensions 496, 497 or removably attachable to the respective frame extensions 496, 497. In one embodiment, any suitable connector mechanism 498 is provided for securing the temple pieces 46, 47 to the respective frame extension 496, 497.

Glasses 491 includes computer 401, and just as with computer 376, computer 401 may be implemented using the processor elements of camera device 210, including video processor 212, high-speed circuitry 230, and low-power circuitry 220, and computer 401 may additionally include any circuitry needed to power and process information for the integrated display elements.

Sensors 402 include one or more cameras, which may be similar to camera 214 and/or other digital sensors that face outward, away from the user. The data feeds from these sensors 402 go to computer 401. In the embodiment of FIG. 4 the computer 401 is disposed within the first portion 51 of right temple piece 47, although the computer 401 could be disposed elsewhere in alternative embodiments. In the embodiment of FIG. 4, right temple piece 47 includes removable cover section 403 for access to computer 401 or other electronic components of glasses 491.

Glasses 491 include optical elements or assemblies 405, which may be similar to any other optical elements or assemblies described herein. One optical assembly 405 is shown, but in other embodiments, optical assemblies may be provided for both eyes of a user. Optical assembly 405 includes laser projector 407, which is a three-color laser projector using a scanning mirror or galvanometer. During operation, an optical source such as a laser projector is disposed in one of the arms or temples of the glasses, and is shown in right temple piece 47 of glasses 491. The computer 401 connects to the laser projector 407. The optical assembly 605 includes one or more optical strips 411. The optical strips 411 are spaced apart across the width of lens 492, as illustrated by lens 492 in right optical element holder 37 of FIG. 4. In other embodiments, the optical strips 411 may be spaced apart across a depth of the lens 492 between the front surface 493 and the rear surface 494 of lens 492 as shown in the partial view of lens 492 in the top corner of FIG. 4.

During operation, computer 401 sends data to laser projector 407. A plurality of light paths 412 are depicted, showing the paths of respective photons emitted by the laser projector 407. The path arrows illustrate how lenses or other optical elements direct the photons on paths 412 that take the photons from the laser projector 407 to the lens 492. As the photons then travel across the lens 492, the photons encounter a series of optical strips 411. When a particular photon encounters a particular optical strip 411, it is either redirected towards the user's eye, or it passes to the next optical strip 411. Specific photons or beams of light may be controlled by a combination of modulation of laser projector 407 and modulation of optical strips 411. Optical strips 411 may, in certain embodiments, be controlled through mechanical, acoustic, or electromagnetic signals initiated by computer 401.

In one example implementation of the optical strips 411, each strip 411 can use Polymer Dispersed. Liquid Crystal to be opaque or transparent at a given instant of time, per software command from computer 401. In a different example implementation of the optical strips 411, each optical strip 411 can have a specific wavelength of light that it redirects toward the user, passing all the other wavelengths through to the next optical strip 411. In a different example implementation of the optical strips 411, each strip 411 can have certain regions of the strip 411 that cause redirection with other regions passing light, and the laser projector 407 can use high precision steering of the light beams to target the photons at the desired region of the particular intended optical strip 411.

In the embodiment of lens 492 illustrated in the top left of FIG. 4, optical strips 411 are disposed in and spaced apart along the width of a first layer 416 of the lens 492, which is secured in a suitable manner to a second layer 417 of the lens 492. In one embodiment, the front surface 493 is formed by the second layer 417 and the rear surface 494 is formed by the first layer 416. The second layer 417 can be provided with reflective coatings on at least a portion of the surfaces thereof so that the laser light bounces off such surfaces so as to travel along the layer 417 until the light encounters a strip 411 provided in the first layer 416, and is either redirected towards the eye of the user or continues on to the next strip 411 in the manner discussed above.

In various embodiments, the computer 401 may consume power as part of glasses 491 operations for capturing images, transmitting data, or performing other computing processes. Such power consumption may result in heat that may impact the glasses 491 as well as a user wearing the device. Embodiments described herein may function to manage temperature in wearable devices such as glasses 491.

Figure 5:
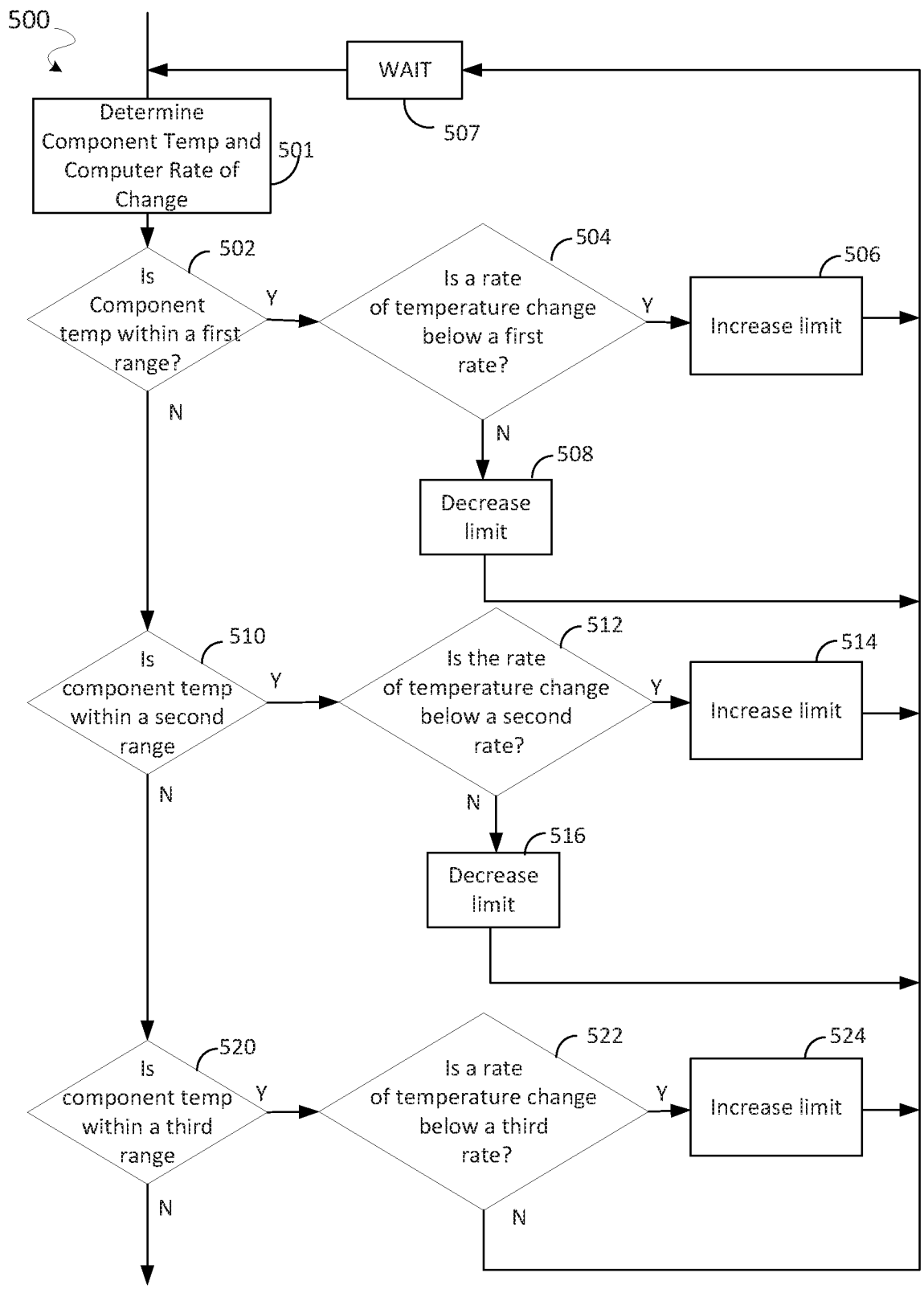
FIG. 5 is a flow diagram illustrating aspects of temperature management in exemplary wearable devices.

FIG. 5 is a flowchart of a method for regulating a temperature of an electronic component. In some aspects, the electronic component regulated by the process 300 discussed below with respect to FIG. 5 may be the low power circuitry 220 and/or high-speed circuitry 230, discussed above with respect to FIG. 2. In some aspects, the low power circuitry 220 and/or high-speed circuitry 230 may be integrated into the glasses 361 of FIG. 3 or glasses 491 of FIG. 4. In some aspects, one or more functions of process 500 discussed below may be performed by the temperature management application 967, discussed below with respect to FIG. 9. For example, in some aspects, instructions 1016, discussed below with respect to FIG. 10, may configure one or more hardware processors, such as hardware processor s 1010 discussed below with respect to FIG. 10, to perform one or more of the functions of process 500 discussed below. In some other embodiments, one or more of the functions of process 500 discussed below may be performed by the computer 61, the camera device 210, or the computers 376 and/or 401 of FIGS. 1-4 respectively.

Process 500 ensures the temperature of the regulated component stays within an acceptable range. The acceptable range may be defined by one or more of an operating range specified by the component manufacturer, and a range that provides for human comfort when operating a device including the component. For example, in some aspects, the camera device 210 may be integrated into a wearable component, such that temperatures of the electronic components of the camera device 210, (e.g. the low-power circuitry 220 and/or the high-speed circuitry 230) may be transferred to the human operator. Thus, it may be desirable to regulate the temperature of these components to not only stay within the operating ranges specified by their respective manufacturers, but also to provide for human comfort of the wearable device when operating. The temperatures may be regulated by controlling an amount of data transmitted by the electronic component during a period of time. In some aspects, a heat generated by an electronic component may be a function of an amount of data the component transmits during a period of time. The more data transmitted, the more heat generated in some aspects. Thus, heat generation may be proportional to data transmission rate in some aspects. Thus, to control temperature, process 500 may place a limit on an amount of data generated by the regulated electronic component within a period of time. If the temperature of the component is well below certain threshold, the transmission of data may be unlimited, or a relatively high limit may be placed on the data transmitted during a time period. If the temperature of the component is above particular thresholds, or relatively close to a maximum temperature, transmission of data may be limited during the time period. For example, limiting transmission may include, for example, preventing the transmission of data that is otherwise available for transmission based on a current temperature of the component. More details on managing temperature of the electronic component is discussed below. For purposes of discussion, as process 500 may iterate in various embodiments, an operative transmission rate limit of the electronic component when block 501 is entered may be referred to as a first transmission rate limit.

At block 501, a temperature of a component is determined. The component may be the low power circuitry 220 or the high speed circuitry 230 discussed above with respect to FIG. 2 in some aspects. The temperature may be determined in some aspects, by reading a temperature value from the component itself. For example, some components may have built in temperature sensors, and can provide the temperature of the component. In other aspects, some devices may include a separate temperature sensor positioned proximate to the component, such that a reading of the temperature sensor correlates with a temperature of the component. Process 500 may then rely on the separate temperature sensor in these aspects. Block 501 may also include determination of a rate of temperature change. For example, block 501 may store a previous n number of temperature values, and compute a rate of change based on the store values. This determined rate may be used by one or more of the decision blocks discussed below and shown in FIG. 5 to determine whether to increase or decrease a transmission rate limit of the component.

Decision block 502 determines whether a component temperature is within a first predetermined temperature range. In some aspects, the component may be the low power circuitry 220 and/or the high-speed circuitry 230, discussed above with respect to FIG. 2. In some aspects, the first predetermined temperature range may be a range of 20 degrees Celsius. For example, in some aspects, the range may be between 0° C. and 20° C.

If the temperature of the component is within the first predetermined range, process 500 moves from decision block 502 to decision block 504, which evaluates whether a rate of temperature change of the component is below a first predetermined rate. In some aspects, temperatures of the component may be recorded periodically, for example, once every one (1) second, two (2) seconds, three (3) seconds, tour (4) seconds, five (5) seconds, ten (10) seconds, fifteen (15) seconds, thirty (30) seconds, or sixty (60) seconds. A rate of temperature change over a time period may then be determined as described above with respect to block 501. In some aspects, the rate is determined based on two or more temperature recordings of the component. The rate may be determined based on a rolling time period. For example, the rate may be determined based on temperature readings made during the last one minute, two minutes, three minutes, four minutes, five minutes or any time period.

If the rate of temperature change is below a first predetermined threshold rate, process 500 moves to block 506, and a transmission rate limit of bandwidth/throughput of the component is increased from a first limit to a second limit. In some aspects, the first predetermined threshold rate may be 15° C./min. In some aspects, this may result in the component transmitting data at a transmission rate above the first limit. In some aspects, block 506 increases the transmission rate limit by 2 Mbit/sec. in some aspects, an amount the transmission rate is increased may be based on a difference between a maximum wearable temperature and a current wearable temperature. For example, block 506 may incorporate one or more of the functions discussed below with respect to FIG. 8. In some aspects, the adjustment may be based on an ambient temperature, as also discussed below.

If the rate of temperature change is not below the first predetermined threshold rate, process 500 moves to block 508, and the transmission rate limit is decreased from the first limit to a third limit. In some aspects, block 508 decreases the transmission rate limit by 2 Mbit/sec. In some aspects, an amount the transmission rate is decreased in block 508 may be based on a difference between a maximum wearable temperature and a current wearable temperature. For example, block 508 may incorporate one or more of the functions discussed below with respect to FIG. 8. In some aspects, the adjustment may be based on an ambient temperature, as also discussed below. After adjusting the transmission rate limit in blocks 506 or 508, process 500 moves to block 507.

After either of blocks 506 or 508 is performed, process 500 moves to block 507. Block 507 may wait for a period of time. In some aspects, the wait in block 507 may provide a specific periodicity to the temperature control loop implemented by process 500. For example, in some aspects, wait block 507 may induce a periodicity between iterations of the wait block 507, thus indirectly causing process 500 as a whole to iterate at the periodicity.

After block 507 completes its wait, process 500 returns to block 501.

Returning to the discussion of decision block 502, if the component temperature evaluated in block 502 is not within the first temperature range, process 500 moves from decision block 502 to decision block 510. Decision block 510 evaluates whether the temperature of the component is within a second predetermined temperature range. In some aspects, the second temperature range may be broader than the first temperature range. In some aspects, the second temperature range may include a higher set of temperatures than the first temperature range. In some aspects, the first and second temperature ranges do not overlap, but are adjoining, in that there are no temperature measurements that may, fall between the first range and the second range.

In some aspects, the second temperature range may be 28 degrees Celsius wide. For example, in some aspects, the second temperature range may be between 21° C. and 49° C. If the component temperature determined in block 501 is within the second range, process 500 moves to decision block 512, which determines whether the rate of temperature change is below a second predetermined rate.

As discussed above with respect to decision block 501, temperatures of the component may be recorded periodically, for example, once every one (1) second, two (2) seconds, three (3) seconds, four (4) seconds, five (5) seconds, ten (10) seconds, fifteen (15) seconds, thirty (30) seconds, or sixty (60) seconds. The rate of temperature change over a time period may then be determined. In some aspects, the rate is determined based on two or more temperature recordings of the component. The rate may be determined based on a rolling time period. For example, the rate may be determined based on temperature readings made during the last one minute, two minutes, three minutes, four minutes, five minutes or any time period.

In some aspects, the second predetermined rate may be lower than the first rate of block 504. For example, in some aspects of process 500, a first rate of temperature rise may be tolerated when the temperature of the component is with a first range, whereas a second rate, lower than the first rate, may be tolerated when the temperature of the component is within a second range higher than the first range.

If the rate of temperature change is below the second rate, process 500 moves from decision block 512 to block 514, where the transmission rate limit is increased from the first transmission rate limit to a fourth transmission rate limit. In some aspects, the limit is increased by 2 Mbit/sec in block 514. In some aspects, an amount the transmission rate is increased may be based on a difference between a maximum wearable temperature and a current wearable temperature. For example, block 514 may incorporate one or more of the functions discussed below with respect to FIG. 8. In some aspects, the adjustment may be based on an ambient temperature, as also discussed below.

Otherwise, if the rate of temperature change is not below the second rate in block 512, process 500 moves to block 516, which decreases the transmission rate limit from the first transmission rate limit to a fifth transmission rate limit. In some aspects, the first limit may be reduced by 2 Mbit/sec in block 516. In some aspects, an amount the transmission rate is increased may be based on a difference between a maximum wearable temperature and a current wearable temperature. For example, block 516 may incorporate one or more of the functions discussed below with respect to FIG. 8. In some aspects, the adjustment may be based on an ambient temperature, as also discussed below.

Returning to the discussion of decision block 510, if the component temperature is not within the second predetermined range, process 500 moves to decision block 520, which determines if the component temperature is within a third predetermined temperature range. In some aspects, the third temperature range is between 50° C. and 80° C. In some aspects, the third temperature range is any temperature over a predetermined temperature value, such as 50° C. If the component temperature is within the third temperature range, then process 500 moves to decision block 522, which determines if the rate determined in block 501 is below a third predetermined threshold rate. In some aspects, the third predetermined threshold rate may be 5° C./minute. If the rate is below the third rate, process 500 moves to block 524, where the transmission rate limit of the component is increased. In some aspects, the transmission rate limit may be increased by 2 Mbit/sec.

Returning to the discussion of decision block 520, if the determined temperature is not within the third temperature range, processing continues below.

In some aspects, the second and fourth transmission rate limits may be equivalent, and the third and fifth transmission rate limits may be equivalent. In other aspects, these limits may be different. For example, multiple iterations of process 500 may cause these limits to diverge.

Some aspects of process 500 may also include maximum temperature limits for the component. In these aspects, if the temperature of the component exceeds the maximum temperature limit, the component may be shutdown. In other words, the transmission rate limit may be set to zero in some aspects. For example, in some aspects, the low power circuitry 220 may be shut down if its temperature exceeds 63° C. In some aspects, the high-speed circuitry 230 may be shut down if its temperature exceeds 73° C.

Some aspects of process 500 also include limiting an amount of data transmitted during a time period to an amount indicated by the transmission rate limit. For example, in some aspects, a moving count of data transmitted during a sequential series of time periods may be maintained. These moving counts can facilitate determination of data transmission rates over those same time periods. If the moving count indicates that the device has reached the transmission rate limit as defined by process 500 above, then delays may be introduced into transmission of additional data. For example, if an amount of data available for transmission would cause the device to exceed the transmission rate limit for a given time period, that data may wait until a later time such that a rate of transmission that includes the data does not exceed the transmission rate limit.

Some aspects of process 500 may deviate from the transmission rate limits discussed above. For example, in some aspects, process 500 may consider a prospective completion time of a current transmission when determining whether to decrease a transmission rate in block 508 and/or 516. For example, if a current transmission will complete within a timeframe such that a temperature of the wireless component will not exceed certain operational parameters, the transmission rate may not be decreased. Upon completion of the current transmission, the temperature rate may be reevaluated, for example, upon initiating of a next transmission. For example, the current transmission may include transmission of a file. The file may be an image file, a video file, or any type of file. The file may represent a discrete set of data, such that an end time for the transmission can be determined. For example, an end time may be determined based on an amount of data of the file that remains unacknowledged by a remote device to which the file is being transmitted, and a current transmission rate of data to the remote device. From this information, a completion time may be determined.

Based on the completion time and a current time, a remaining time may be determined. Furthermore, based on a remaining time, a current rate of temperature change, and a current temperature, a temperature at the completion time may be determined, for example, via. Equation (1) below:

$$\text{completion temperature} = ct + tr^*(rt) \qquad (1)$$

where:
ct=current temperature
tr=time remaining
rt=rate of temperature change

In some aspects, if the completion temperature is less than an operational limit threshold, then a decrease of the transmission rate limit, such as described above with respect to blocks 508 and/or 516, may be deferred until at least the completion time.

Figure 6:
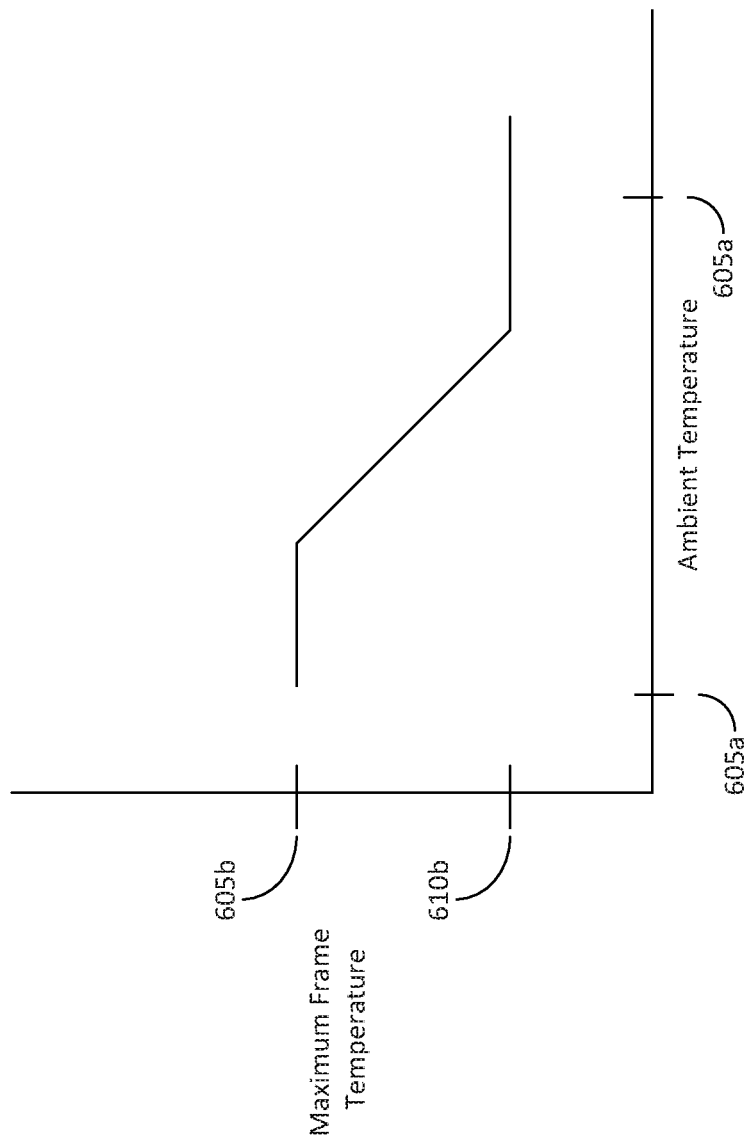
FIG. 6 is a graph showing a relationship between ambient temperature and acceptable wearable device temperature.

FIG. 6 is a graph illustrating an exemplary relationship between ambient temperature and a maximum comfortable temperature for a wearable device. The graph 600 shows that when ambient temperatures are relatively cool, such as at ambient temperature 605a, a relatively higher wearable device temperature 605b may be considered comfortable. For example, on a cold winter's day, a user of a wearable device may in some aspects, take comfort in a wearable device that is relatively warm. In contrast, on a hot day, such as that reflected by ambient temperature 610a, a user may find a device operating at that same temperature as intolerably warm. Instead, a lower temperature 610b may be considered comfortable. Some aspects of the disclosed methods and systems may consider ambient temperature when determining a maximum frame temperature, and may adjust a maximum transmission rate of the disclosed transmission circuitry to maintain frame temperature at a temperature comfortable for the ambient conditions.

Figure 7:
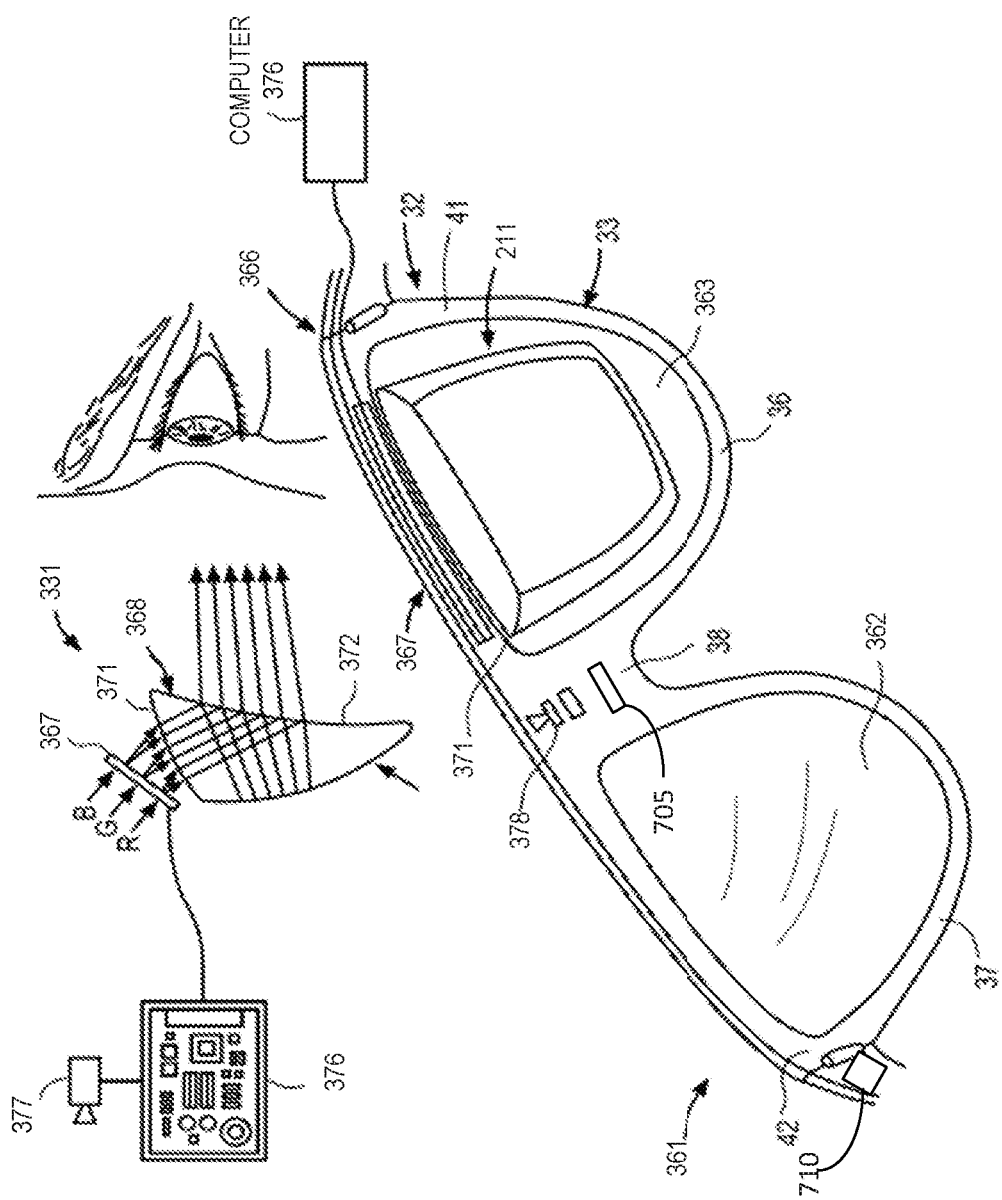
FIG. 7 illustrates a wearable device including transmission components, an ambient temperature sensor, and a wearable temperature sensor in accordance with certain example embodiments.

FIG. 7 shows another exemplary embodiment of glasses 361. The embodiment of glasses 361 shown in FIG. 7 includes the components of glasses 361 shown in FIG. 3. In this embodiment, the glasses 361 also include an ambient temperature sensor 705 and a frame temperature sensor 710. The ambient temperature sensor 705 and frame temperature sensor 710 may be included in the peripheral device elements 219, discussed above with respect to FIG. 2. In some aspects, the ambient temperature sensor 705 and frame temperature sensor 710 may be operably connected to the computer 376, such that the computer may obtain temperature measurements of the ambient environment and the frame from the ambient temperature sensor 705 and frame temperature sensor 710 respectively.

Figure 8:
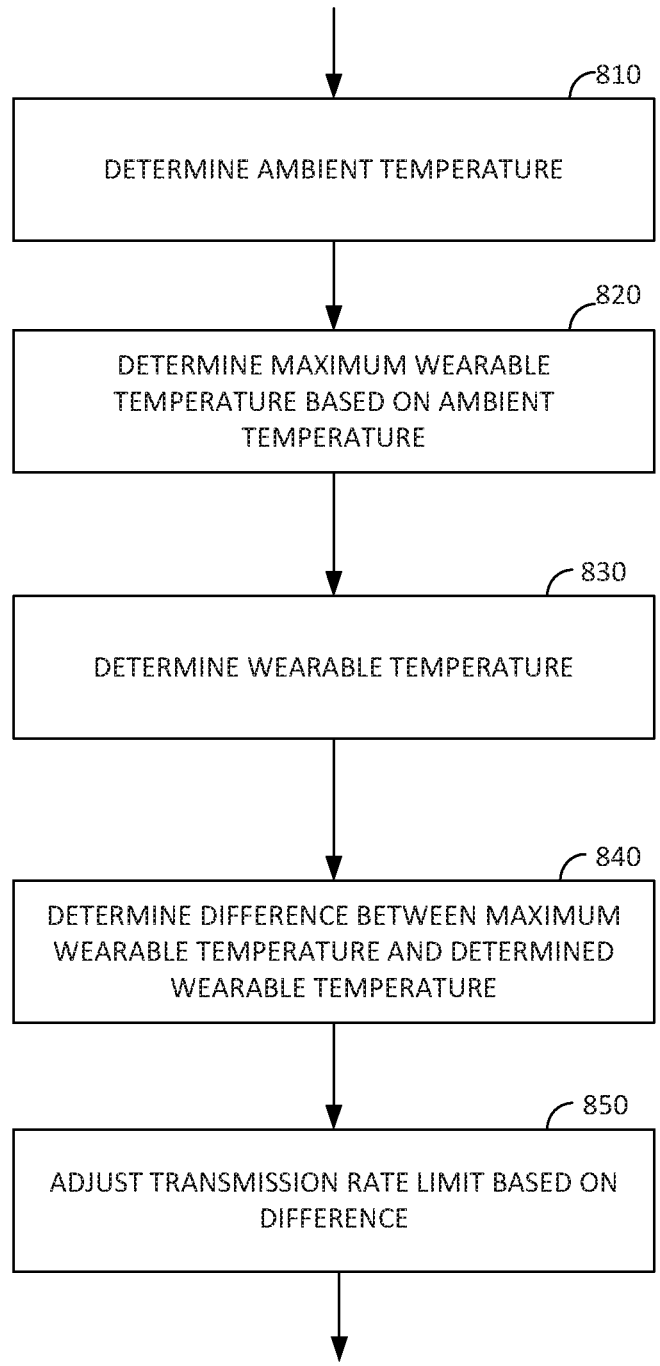
FIG. 8 is a flowchart for an exemplary method of temperature management of a wearable device.

FIG. 8 is a flowchart of an exemplary method of managing temperature of a wearable device. In some aspects, process 800 discussed below with respect to FIG. 8 may operate in conjunction with process 500, discussed above with respect to FIG. 5. In some aspects, one or more of the functions discussed below with respect to FIG. 8 may be performed by the computer 376, discussed above with respect to FIG. 3 and FIG. 7.

Process 800 may utilize a lookup table that represents a relationship between an ambient temperature and a maximum frame temperature, for example, as shown above with respect to graph 600. In other aspects, process 800 may utilize an equation to generate a maximum frame temperature based on an ambient temperature. For example, an exemplary equation is Equation 2, shown below:

$$\text{Max temperature} = K - \text{Ambient temperature} \qquad (2)$$

where:
K is a constant value.

Block 810 determines an ambient temperature. In some aspects, the ambient temperature may be determined via readings from an ambient temperature sensor, such as the sensor 705 discussed above.

In block 820, a maximum wearable temperature is determined based on the ambient temperature. In some aspects, the maximum wearable temperature may be determined based on Equation 2 above, and utilizing the ambient temperature determined in block 810. In some other aspects, a mapping table may be utilized to determine the maximum wearable temperature based on the ambient temperature. For example, a mapping table may provide maximum ambient temperatures for a set of ambient temperatures. An example of such a mapping is provided in graph 600, discussed above with respect to FIG. 6.

In block 830, a wearable temperature is determined. In some aspects, the wearable temperature is determined based on readings from a temperature sensor, such as temperature sensor 710, discussed above with respect to FIG. 7.

In block 840, a difference between the maximum wearable temperature determined in block 820 and the determined wearable temperature in block 830 is obtained.

In block 850, a transmission rate limit is adjusted based on the difference. In some aspects, if the difference is less than a threshold, the transmission rate limit may be reduced. If the difference is not less than the threshold, the transmission rate may be maintained. In some aspects, if the difference is greater than a second threshold, the transmission rate limit may be increased, but not to exceed a maximum value.

While the methods described above present operations in a particular order, it will be appreciated that alternate embodiments may operate with certain operations occurring simultaneously or in a different order. In many such embodiments, the order and tinting of operations may vary between instances of the operation, with the exact timing managed by a low-power processor such as the low-power processor 222 operating to reduce power usage, and to return the device to a low-power state as quickly as possible.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

Figure 9:
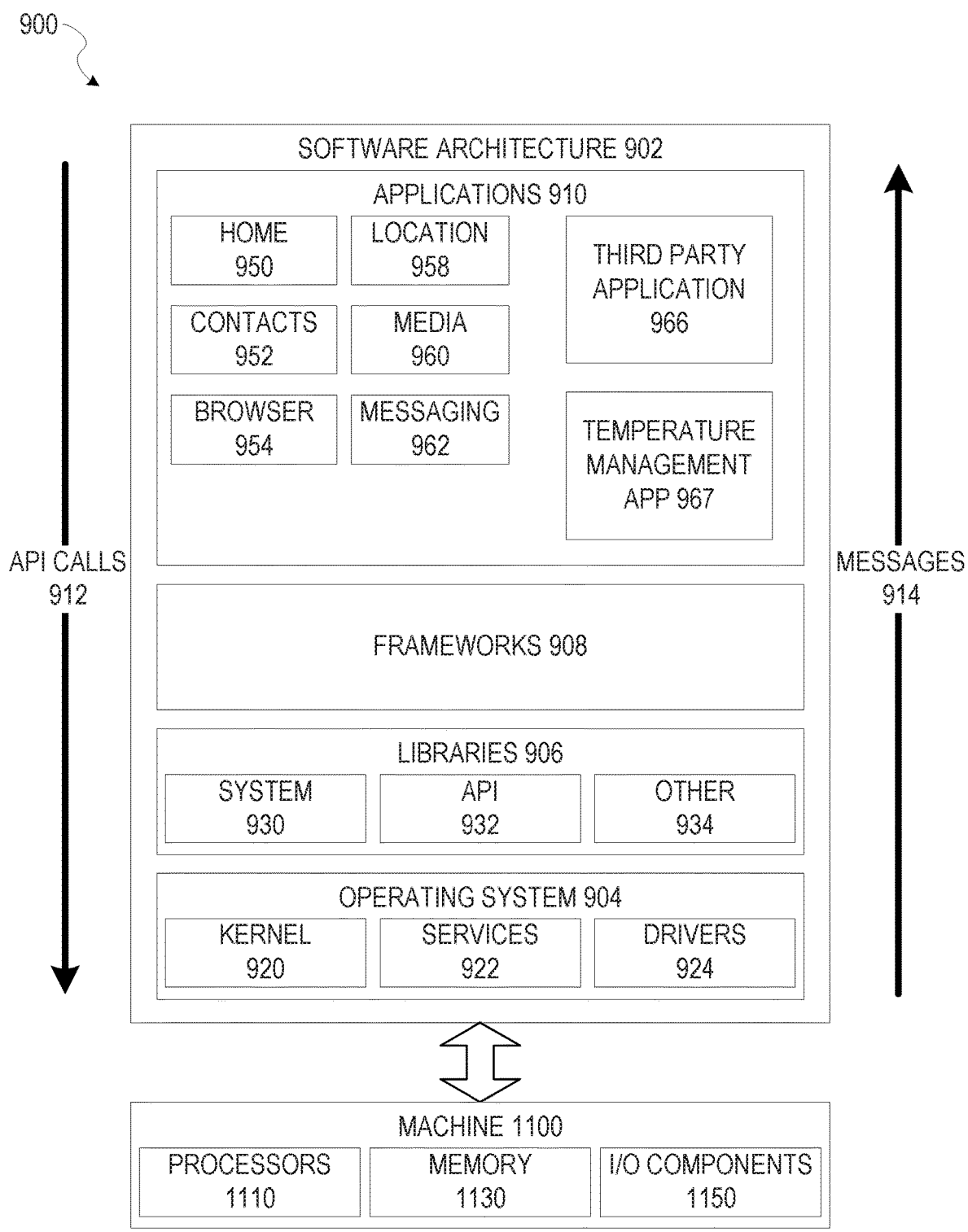
FIG. 9 is a block diagram illustrating an example of a software architecture that may be installed on a machine, according to some example embodiments.

FIG. 9 is a block diagram 900 illustrating an architecture of software 902, which can be installed on any one or more of the devices described above. FIG. 9 is merely a non-limiting example of a software architecture, and it will be appreciated that many other architectures can be implemented to facilitate the functionality described herein. In various embodiments, the software 902 is implemented by hardware such as computer 61, camera device 210, computer 376, and/or computer 401 of FIGS. 1, 2, 3, and 4 respectively. In some aspects, the software 902 may be executed by a machine 1000 of FIG. 10, discussed below. The software 902 may include a stack of layers where each layer may provide a particular functionality. For example, the software 902 may include one or more layers such as an operating system 904, libraries 906, frameworks 908, and applications 910. Operationally, the applications 910 invoke application programming interface (API) calls 912 through the software stack and receive messages 914 in response to the API calls 912, consistent with some embodiments. In various embodiments, any client device 290, server computer of a server system 298, or any other device described herein may operate using elements of software 902. Devices such as the camera device 210 may additionally be implemented using aspects of software 902, with the architecture adapted for operating using low-power circuitry (e.g., low-power circuitry 220) and high-speed circuitry (e.g., high-speed circuitry 230) as described herein.

In various implementations, the operating system 904 manages hardware resources and provides common services. The operating system 904 includes, for example, a kernel 920, services 922, and drivers 924, The kernel 920 acts as an abstraction layer between the hardware and the other software layers consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth. In certain implementations of a device such as the camera device 210, low-power circuitry may operate using drivers 924 that only contain BLUETOOTH® Low Energy drivers and basic logic for managing communications and controlling other devices, with other drivers operating with high-speed circuitry.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface (GUI) functions, high-level resource management, high-level location services, and so forth. The frameworks 908 can provide a broad spectrum of other APIs that can be utilized by the applications 910, some of which may be specific to a particular operating system or platform.

In an example embodiment, the applications 910 may include a home application 950, a contacts application 952, a browser application 954, a location application 958, a media application 960, a messaging application 962, and a broad assortment of other applications such as a third party application 966. According to some embodiments, the applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application 966 can invoke the API calls 912 provided by the operating system 904 to facilitate functionality described herein.

Embodiments described herein may particularly interact with a temperature management application 967. Such an application 967 may interact with communication component 1064, discussed below with respect to FIG. 10, to manage transmission bandwidth to ensure operating temperature of a wearable device remains within certain ranges, as discussed above, for example, with respect to FIG. 5. As discussed above, operation of electronic components may generate heat. The electronic components may also have an operating temperature range. Temperatures outside the range may cause faulty operation of the electronic components. Additionally, with respect to wearable devices, operating temperatures of electronic components may affect a comfort level of a user of the wearable device. The temperature management application 967 may function to manage temperature of one or more electronic components to ensure both operating ranges of the electronic devices and comfort ranges of users of wearable devices are maintained. \

Figure 10:
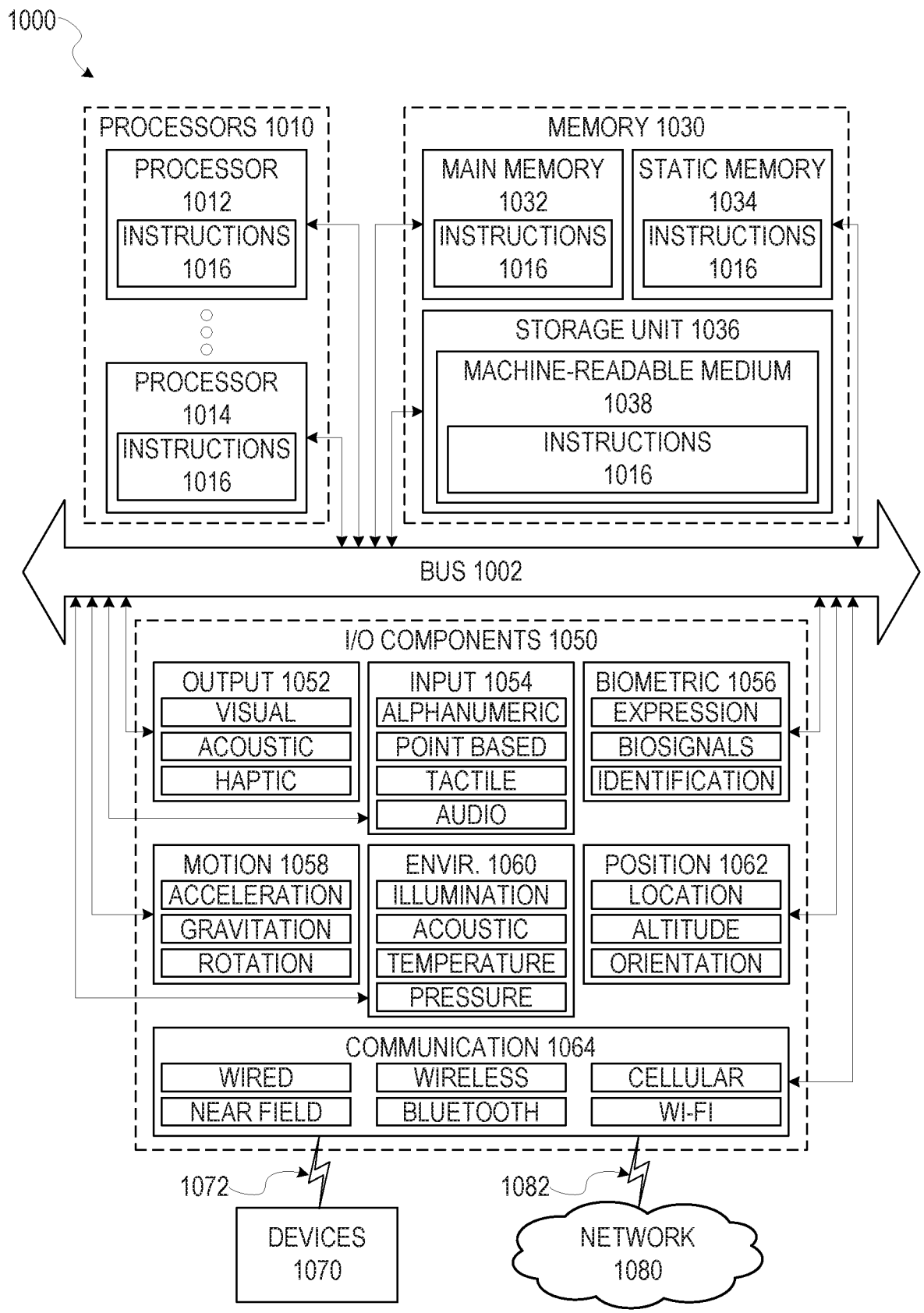
FIG. 10 illustrates a diagrammatic representation of a machine in the form of a computer system within which a set of instructions may be executed for causing the machine to perform any one or more of the methodologies discussed herein, according to an example embodiment.

FIG. 10 illustrates an example mobile device 1000 executing a mobile operating system (e.g., IOS™, ANDROID™, WINDOWS® Phone, or other mobile operating systems), consistent with some embodiments. In one embodiment, the mobile device 1000 includes a touch screen operable to receive tactile data from a user.

Many varieties of applications (also referred to as "apps") can be executing on the mobile device 1000, such as native applications (e.g., applications programmed in Objective-C, Swift, or another suitable language running on IOS™ or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 1000 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 1000 includes a social messaging app such as SNAPCHAT® that, consistent with some embodiments, allows users to exchange ephemeral messages that include media content. In this example, the social messaging app can incorporate aspects of embodiments described herein.

Such a social messaging application may integrate the functionality of the temperature management application 967 to manage temperature of electronic components included in the device 1000.

FIG. 10 shows a diagrammatic representation of a machine 1000 in the example form of a computer system, within which instructions 1016 (e.g., software, a program, an application, an applet, an app, or other executable code) for causing the machine 1000 to perform any one or more of the methodologies discussed herein can be executed. In alternative embodiments, the machine 1000 operates as a standalone device or can be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

In various embodiments, the machine 1000 comprises processors 1010, memory 1030, and I/O components 1050, which can be configured to communicate with each other via a bus 1002. In an example embodiment, the processors 1010 (e.g., a Central Processing Unit (CPU), a Reduced Instruction Set Computing (RISC) processor, a Complex instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) include, for example, a processor 1012 and a processor 1014 that may execute the instructions 1016. The term "processor" is intended to include multi-core processors that may comprise two or more independent processors (also referred to as "cores") that can execute instructions contemporaneously, Although FIG. 10 shows multiple processors 1010, the machine 1000 may include a single processor with a single core, a single processor with multiple cores (e.g., a multi-core processor), multiple processors with a single core, multiple processors with multiples cores, or any combination thereof.

The memory 1030 comprises a main memory 1032, a static memory 1034, and a storage unit 1036 accessible to the processors 1010 via the bus 1002, according to some embodiments. The storage unit 1036 can include a machine-readable medium 1038 on which are stored the instructions 1016 embodying any one or more of the methodologies or functions described herein. The instructions 1016 can also reside, completely or at least partially, within the main memory 1032, within the static memory 1034, within at least one of the processors 1010 (e.g., within the processor's cache memory), or any suitable combination thereof, during execution thereof by the machine 1000. Accordingly, in various embodiments, the main memory 1032, the static memory 1034, and the processors 1010 are considered machine-readable media 1038.

As used herein, the term "memory" refers to a machine-readable medium 1038 able to store data temporarily or permanently and may be taken to include, but not be limited to, random-access memory (RAM), read-only memory (ROM), buffer memory, flash memory, and cache memory. While the machine-readable medium 1038 is shown in an example embodiment to be a single medium, the term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by one or more processors of the machine 1000 (e.g., processors 1010), cause the machine 1000 to perform any one or more of the methodologies described herein. Accordingly, a. "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1050 include a wide variety of components to receive input, provide output, produce output, transmit information, exchange information, capture measurements, and so on. In general, it will be appreciated that the I/O components 1050 can include many other components that are not shown in FIG. 10. The I/O components 1050 are grouped according to functionality, merely for simplifying the following discussion, and the grouping is in no way limiting. In various example embodiments, the I/O components 1050 include output components 1052 and input components 1054. The output components 1052 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1054 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1050 include biometric components 1056, motion components 1058, environmental components 1060, or position components 1062, among a wide array of other components. For example, the biometric components 1056 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 include acceleration sensor components (e.g., accelerometer), gravitation sensor components, rotation sensor components (e.g., gyroscope), and so forth. The environmental components 1060 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The environmental components, such as the temperature sensor components that detect ambient temperature, may be utilized to manage the temperature of electronic components discussed herein.

The position components 1062 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 include a network interface component or another suitable device to interface with the network 1080. In further examples, communication components 1064 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1070 may be another machine or any of a wide variety of peripheral devices (e.g., a peripheral device coupled via a Universal Serial Bus (USB)). As discussed above, in some aspects, the disclosed methods and systems may manage the transmission bandwidth of one or more of the wireless components (e.g. WiFi) and/or Bluetooth components in order to control an operating temperature of a device, such as the device 1000. In some aspects, the communication components 1064 included the low power circuitry 220 and/or high speed circuitry 230.

In some embodiments, the communication components 1064 detect identifiers or include components operable to detect identifiers. For example, the communication components 1064 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1064, such as location via Internet Protocol (IP) geo-location, location via WI-FI® signal triangulation, location via detecting an BLUETOOTH® or NFC beacon signal that may indicate a particular location, and so forth.

Transmission Medium

In various example embodiments, one or more portions of the network 1080 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FT® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 can implement any, of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1016 are transmitted or received over the network 1080 using a transmission medium via a network interface device (e.g., a network interface component included in the communication components 1064) and utilizing any one of a number of well-known transfer protocols (e.g., Hypertext Transfer Protocol (HTTP)). Similarly, in other example embodiments, the instructions 1016 are transmitted or received using a transmission medium via the coupling 1072 (e.g., a peer-to-peer coupling) to the devices 1070. The term "transmission medium" shall be taken to include any intangible medium that is capable of storing, encoding, or carrying the instructions 1016 for execution by the machine 1000, and includes digital or analog communications signals or other intangible media to facilitate communication of such software.

Furthermore, the machine-readable medium 1038 is non-transitory other words, not having any transitory signals) in that it does not embody a propagating signal. However, labeling the machine-readable medium 1038 "non-transitory" should not be construed to mean that the medium is incapable of movement; the medium 1038 should be considered as being transportable from one physical location to another. Additionally, since the machine-readable medium 1038 is tangible, the medium 1038 may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A wearable electronic device, comprising:
   electronic hardware memory storing instructions that when executed by a hardware processing circuitry of the wearable electronic device, configures the hardware processing circuitry to perform operations comprising:
   computing a remaining time for completing transfer of data from the wearable electronic, device;
   determining a current rate of temperature change and a current temperature of the wearable electronic device;
   computing a completion temperature of the wearable electronic device based on the remaining time for completing the transfer of the data, the current rate of temperature change, and the current temperature of the wearable electronic device; and
   performing a transmission rate function in response to determining that the completion temperature of the wearable electronic device is less than a specified threshold.

2. The wearable electronic device of claim 1, wherein the operations further comprise performing the computing of the remaining time in response to determining whether to decrease a transmission rate of the wearable electronic device.

3. The wearable electronic device of claim 1, wherein the transmission rate function comprises decreasing a transmission rate of the wearable electronic device.

4. The wearable electronic device of claim 1, wherein the wearable electronic device comprises glasses that comprise a frame, and the wearable electronic device further comprises a frame temperature sensor configured to measure a temperature of the frame, and wherein the determining of the current temperature of the wearable electronic device is based on the frame temperature sensor.

5. The wearable electronic device of claim 1, wherein the operations further comprise:
   determining an amount of the data that remains unacknowledged by a remote device to which the data is being transmitted; and
   determining a current transmission rate of the wearable electronic device.

6. The wearable electronic device of claim 5, wherein the operations further comprise:
   computing the remaining time by dividing the amount of data by the current transmission rate; and
   computing the completion temperature by adding the current temperature of the wearable electronic device to the remaining time multiplied by the rate of temperature change.

7. The wearable electronic device of claim 1, further comprising a wireless transmitter temperature sensor, the operations further comprising reading data from the wireless transmitter temperature sensor, and determining the current temperature of the wearable electronic device based on the data read from the wireless transmitter temperature sensor.

8. The wearable electronic device of claim 1, the operations further comprising:
   comparing the current rate of temperature change to a first rate threshold or a second rate threshold in response to the current temperature of the wearable electronic device falling within a first temperature range or a second temperature range, respectively; and
   adjusting a transmission rate limit in response to the comparison.

9. The wearable electronic device of claim 8, wherein the operations further comprise adjusting the transmission rate of the wearable electronic device by delaying transmissions to avoid exceeding the adjusted transmission rate limit.

10. The wearable electronic device of claim 1, wherein the operations further comprise:
    determining which of one of a first temperature range and a second adjacent temperature range the current temperature of the wearable electronic device is within; and
    adjusting a transmission rate limit based on the determination of which of one of the first temperature range and the second adjacent temperature range the current temperature of the wearable electronic device is within.

11. The wearable electronic device of claim 10, wherein the operations further comprise increasing the transmission rate limit in response to the current rate of temperature change exceeding a first or second rate threshold and decreasing the transmission rate limit otherwise.

12. The wearable electronic device of claim 11, wherein the operations further comprise increasing or decreasing the transmission rate limit by 2 Mbit/sec.

13. The wearable electronic device of claim 11, wherein the first rate threshold is 15 degrees Celsius per minute, and the second rate threshold is 10 degrees Celsius per minute.

14. A method comprising:
    computing, by one or more processors, a remaining time for completing transfer of data from a wearable electronic device;
    determining a current rate of temperature change and a current temperature of the wearable electronic device;
    computing a completion temperature of the wearable electronic device based on the remaining time for completing the transfer of the data, the current rate of temperature change, and the current temperature of the wearable electronic device; and
    performing a transmission rate function in response to determining that the completion temperature of the wearable electronic device is less than a specified threshold.

15. The method of claim 14, further comprising performing the computing of the remaining time in response to determining whether to decrease a transmission rate.

16. The method of claim 14, wherein the transmission rate function comprises decreasing a transmission rate of the wearable electronic device.

17. The method of claim 14, wherein the wearable electronic device comprises glasses that comprise a frame, and the wearable electronic device further comprises a frame temperature sensor configured to measure a temperature of the frame, and wherein the determining of the current temperature of the wearable electronic device is based on the frame temperature sensor.

18. A non-transitory computer-readable storage medium comprising instructions that, when executed, configure hardware processing circuitry to perform operations comprising:
- computing a remaining time for completing transfer of data from a wearable electronic device;
- determining a current rate of temperature change and a current temperature of the wearable electronic device;
- computing a completion temperature of the wearable electronic device based on the remaining time for completing the transfer of the data, the current rate of temperature change, and the current temperature of the wearable electronic device; and
- performing a transmission rate function in response to determining that the completion temperature of the wearable electronic device is less than a specified threshold.

19. The non-transitory computer-readable storage medium of claim 18, wherein the operations further comprise performing the computing of the remaining time in response to determining whether to decrease a transmission rate of the wearable electronic device.

20. The non-transitory computer-readable storage medium of claim 18, wherein the transmission rate function comprises decreasing a transmission rate of the wearable electronic device.

* * * * *

UNITED STATES PATENT AND TRADEMARK OFFICE
CERTIFICATE OF CORRECTION

PATENT NO. : 11,068,034 B2
APPLICATION NO. : 16/723663
DATED : July 20, 2021
INVENTOR(S) : Ashwood et al.

Page 1 of 1

It is certified that error appears in the above-identified patent and that said Letters Patent is hereby corrected as shown below:

In the Claims

In Column 25, Line 22, in Claim 1, delete "electronic," and insert --electronic-- therefor Signed and Sealed this
Eleventh Day of January, 2022

Drew Hirshfeld
*Performing the Functions and Duties of the*
*Under Secretary of Commerce for Intellectual Property and*
*Director of the United States Patent and Trademark Office*